ated Stat# United States Patent [19]

McMullen

[11] 3,865,881
[45] Feb. 11, 1975

[54] PREPARATION OF KETONES
[75] Inventor: Charles H. McMullen, Scarsdale, N.Y.
[73] Assignee: Union Carbide Corporation, New York, N.Y.
[22] Filed: Mar. 22, 1972
[21] Appl. No.: 236,997

[52] U.S. Cl............ 260/593 R, 260/592, 260/593 A, 260/593 P, 260/681 R
[51] Int. Cl............................................. C07c 49/06
[58] Field of Search .................................. 260/593 R

[56]  References Cited
UNITED STATES PATENTS
2,517,684  8/1950  Ladd................................ 260/597 R
2,650,253  8/1953  Rust et al........................ 260/597 R
3,213,149  10/1965  Takahashi et al.................. 260/642

OTHER PUBLICATIONS
Vinogradov et al., "Isuestiya Akadem Mauk, Ser. Khim" No. 2, p. 322–328, February, 1968.

G. Frank, "Chemreviews," 46, February, 1950, pp. 155–169.

Primary Examiner—Joseph E. Evans
Assistant Examiner—D. B. Springer
Attorney, Agent, or Firm—Charles J. Metz

[57]  ABSTRACT

A process for the preparation of liquid ketones which comprises coupling a saturated aldehyde, e.g., acetaldehyde, with an alpha-olefin, e.g., ethylene, in the presence of an organic hydroperoxide initiator and a metal-containing compound as the catalyst therefor, e.g., cobalt(II) acetylacetonate. The novel process results in good productivities and high initiator efficiencies.

7 Claims, No Drawings

PREPARATION OF KETONES

This invention relates to a process for the preparation of liquid ketones via the coupling reaction of saturated aldehydes with alpha-olefins in the presence of an organic hydroperoxide initiator and a metal-containing compound as the catalyst therefor.

There is disclosed in U.S. Pat. No. 2,402,137 (1946) the so-called telomerization reactions of ethylene with saturated alcohols, aldehydes, ketones, acid esters, acid anhydrides, etc., which are carried out at high pressure in the presence of a peroxygen-type catalyst to give polymers which range from soft greases to hard waxes.

There is also disclosed in the prior art such as U.S. Pat. No. 2,517,732 (1950) the free-radical coupling reaction of a saturated aldehyde with ethylene in the presence of peroxygen-type compounds, i.e., initiators, to produce normally liquid ketone products of the formula

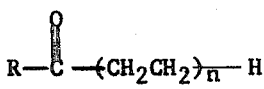

wherein R can be alkyl and $n$ is an integer having a value of from 1 to 6. While it appears that the prior art processes could be quite selective in certain favorable cases, the initiator efficiency and productivity were quite low. These disadvantages made such processes commercially unattractive. The term "initiator efficiency," as used herein, represents the value obtained by dividing the moles of initiator consumed during the coupling reaction into the moles of ketonic products produced during the coupling reaction. The initiator efficiency also can be expressed briefly as the ratio of ketones produced/initiator consumed.

The initiators disclosed in the prior art include oxygen, actinic light, the peroxygen-type compounds such as the dialkyl peroxides, e.g., di-t-butyl peroxide; the acyl peroxides, e.g., dibenzoyl peroxide; the hydroperoxides, e.g., t-butyl hydroperoxides; the peracids, e.g., peracetic acid; the percarbonates; and the like. Dialkyl peroxides generally require relatively high temperatures, e.g., 130°–150°C, with the result that the coupling reaction suffers from poor initiator efficiency and appreciable by-product formation due to decarbonylation of the aldehydic reactant. Peroxy initiators such as dibenzoyl peroxide and dicumyl peroxide are relatively expensive thus detracting from the economics of processes based on their use. It should be noted also that the diacyl peroxides such as dibenzoyl peroxide are relatively more hazardous than the organic hydroperoxides. Thus, for example, dibenzoyl peroxide must be handled with care and is generally used at relatively low operating temperatures, e.g., about 80°–85°C and results in processes of relatively low productivity. In addition, initiator efficiency is relatively low. The use of oxygen as the initiator in the coupling reaction of ethylene with an alkanal must be carefully monitored to avoid the formation of potentially explosive gaseous mixtures with ethylene. During the coupling reaction peracids such as peracetic acid are consumed by a competing reaction which results in the oxidation of the aldehydic reactant to carboxylic acids. Obviously, this is a disadvantage since relatively low initiator efficiencies are achieved in the coupling reaction.

There has now been discovered a novel process for producing ketones which process results in various unexpected advantages. Firstly, by the practise of the invention there is obtained high initiator efficiencies. For instance, it has been observed that the moles of total ketonic products produced with relation to the moles of initiator (hydroperoxide) consumed during the coupling reaction differ by an order of magnitude, e.g., upwards to 15-fold, and more. By optimizing the operative conditions of the novel process one would expect the total ketonic products/initiator consumption ratio to exceed 25. Secondly, in the practice of preferred embodiments of the invention high productivities can be achieved which heretofore were unattainable by prior art processes. By the term "productivity," as used herein, is meant the amount by weight of total ketonic products which is produced in a unit of time per unit of reactor volume. Thirdly, by using the relatively inexpensive organic hydroperoxide initiator in conjunction with the metal-containing catalyst, a fast rate of initiation can be attained at operating temperatures which are quite mild thus avoiding significant decarbonylation of the aldehydic reactant.

In the practice of the invention substantial quantities of liquid ketones are prepared via a process which comprises reacting (i) in the liquid phase; (ii) an alpha-olefin with a saturated aliphatic aldehyde; (iii) in the presence of an initiating amount of an organic hydroperoxide which is characterized by the unit —O—O—H, said unit being monovalently bonded to an aliphatic carbon atom free of ethylenic and acetylenic unsaturation, and (iv) a catalytically effective quantity of a metal-containing compound, the metal moiety of which is capable of readily undergoing a one electron redox cycle between a relatively stable plus two (+2) oxidation state and a relatively stable plus three (+3) oxidation state; (v) at an elevated temperature; and (vi) for a period of time sufficient to produce said liquid ketones.

The present invention thus provides, in the practice of various embodiments, a novel route for coupling an aldehyde with alpha-olefins to produce a mixture of ketones as shown in the following equation:

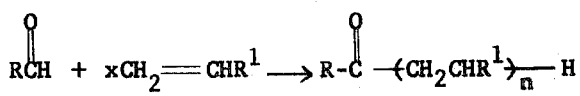

wherein R is alkyl which desirably contains from 1 to 19 carbon atoms, wherein $R^1$ is hydrogen or alkyl which desirably contains from 1 to 18 carbon atoms, and wherein $n$ represents 1, 2, 3, 4 . . . 20, and higher, the sum of which equals the integer $x$. In the practice of preferred embodiments of the invention there can be produced a mixture of liquid dialkyl ketones in which the variable $n$, for the most part, has a value of 1 and 2. For instance, under carefully controlled conditions, the coupling reaction of acetaldehyde and ethylene can result in the formation of ketonic products which contain upwards to about 95 weight percent, and higher, of methyl ethyl ketone and methyl n-butyl ketone. On the other hand, if it is desired to produce high boiling liquid ketones, the operative conditions can be so adjusted to produce a mixture of such ketonic products, i.e., wherein $n$ would represent, for the most part, 4, 5, and 6 in the above equation.

The aldehydes which are particularly useful as reactants in the novel process are the saturated aliphatic aldehydes which desirably contain from 2 to 20 carbon atoms and include, by way of examples, acetaldehyde, propionaldehyde, n-butyraldehyde, isobutyraldehyde, n-caproaldehyde, trimethylacetaldehyde, n-heptaldehyde, 2-ethylhexanal, methylcyclohexanecarboxyaldehyde, and the like. The preferred aldehydes are the alkanals which contain from 2 to 8 carbon atoms. Acetaldehyde is the aldehyde of choice since useful and highly salable methyl alkyl ketones are readily and conveniently prepared in accordance with the practice of the invention.

The alpha-olefins which are suitable in the practice of the invention are characterized by a terminal ethylenic bond, i.e.,

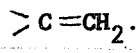

Particularly useful olefins are characterized by the formula $R^1CH=CH_2$ wherein $R^1$ is hydrogen or alkyl desirably having from 1 to 18 carbon atoms. It is preferred that $R^1$ be hydrogen or alkyl of 1 to 6 carbon atoms. Illustrative alpha-olefins include, by way of illustrations, ethylene, propylene, 1-butene, isobutylene, 1-pentene, 1-hexene, 4-methyl-1-octene, 1-nonene, 1-decene, 3-phenylpropene, 1-dodecene, 1-tridecene, 1-hexadecene, 1-octadecene, styrene, and the like.

The organic hydroperoxides which are employed as initiators in the novel process are characterized by the unit —O—O—H said unit being monovalently bonded to an aliphatic carbon atom which is free of ethylene and acetylenic unsaturation as in radicals represented by alkyl, cycloalkyl, aralkyl, and the like. Organic hydroperoxides in which the unit —O—O—H is monovalently bonded to a radical composed of carbon and hydrogen atoms are preferred. Radicals which contain from 4 to 12 carbon atoms and which do not possess ethylenic and acetylenic unsaturation are particularly suitable in the practice of the invention. Preferred organic hydroperoxides are those in which the aforesaid unit is monovalently bonded to a tertiary carbon atom. Illustrative hydroperoxides include ethyl hydroperoxide, isopropyl hydroperoxide, t-butyl hydroperoxide, triphenylmethyl hydroperoxide, cumyl hydroperoxide, benzyl hydroperoxide, 2-hydroxy-2-hydroperoxybutane, cyclohexane hydroperoxide, 1-hydroxymethyl hydroperoxide, decahydronaphthyl hydroperoxide, 1,1-dimethylpropyl hydroperoxide, 1,1,2-trimethylpropyl hydroperoxide, alpha-methyl-alpha-ethylbenzyl hydroperoxide, alpha-methylcyclohexane hydroperoxide, 2,5-dimethylhexyl-2,5-dihydroperoxide, and the like. As intimated above, the tertiary hydroperoxides such as t-butyl hydroperoxide and cumyl hydroperoxide are preferred especially in view of their relative stability and commercial availability.

Metal-containing compounds which are suitable as catalysts in the practice of the invention are those in which the metal moiety is capable of undergoing a one electron redox cycle between a relatively stable plus two (+2) oxidation state and a relatively stable plus three (+3) oxidation state. Particularly desirable metal moieties include the transition metals as characterized by cobalt(II), cobalt(III), manganese(II), manganese(III), chromium(II), chromium(III), iron(II), and iron(III). Nickel and copper, though contemplated within the scope of the invention and though capable of undergoing a one electron redox cycle between their oxidation states, e.g., Ni(I), Ni(II), Cu(I), and Cu(II), are not particularly desirable in the practice of preferred embodiments of the invention.

The metal-containing compounds can be in the form of salts, complexes, oxides, etc., and the metal moiety thereof can be in its higher oxidation state or its lower oxidation state. Illustrative of the metal-containing compounds which are suitable include cobalt(II) acetylacetonate, cobalt(III) acetylacetonate, iron(II) acetylacetonate, iron(III) acetylacetonate, chromium(II) acetylacetonate, chromium(III) acetylacetonate, manganese(II) acetylacetonate, manganese(III) acetylacetonate, chromium(II) oxide, chromium(III) oxide, manganese(II) oxide, manganese(III) oxide, cobalt(III) acetate, cobalt(III) propionate, cobalt(III) butyrate, chromium(II) acetate, manganese(II) acetate, iron(III) acetate, iron(II) carbonate, manganese(II) carbonate, cobalt(II) sulfate, manganese(II) sulfate, iron(II) sulfate, iron(II) ammonium sulfate, iron(III) sulfate, iron(III) chloride, cobalt(II) nitrate, cobalt(II) chloride, cobalt(III) chloride, chromium(III) ethylenediaminetetraacetic acid, cobalt(II) dimethylglyoximate, manganese(III) chloride, and the like. In general, the metal salts of mineral acids, carboxylic acids, oxides, etc., as well as the metal complexes with beta-keto acids, beta-diketones, etc. are useful forms for introducing the metal moiety into the liquid reaction mixture.

Either heterogeneous or homogeneous reaction mixtures may be employed in the practice of the invention. In preferred embodiments, metal-containing catalysts which are soluble in the reaction medium give highly satisfactory results. However, the synthesis of normal ketonic products can be effected by using catalysts which are not homogeneously distributed throughout the reaction mixture. Solid catalysts which remain in place during the course of the reaction may be employed satisfactorily. Suspensions of liquid or solid catalysts in liquid medium may also be employed. The metal-containing compound can also be used in combination with inert materials or contained or deposited on porous supports such as alumina, silica-alumina, silica gel, activated charcoal, titania, zirconia, zeolites as well as the zeolitic molecular sieves, pumice, kieselguhr, inert porous organic polymers, and the like.

The quantity of catalyst employed is not narrowly critical and can vary over a wide range. In general, the novel process is desirably conducted in the presence of a catalytically effective quantity of the metal-containing compound which gives a suitable and reasonable reaction rate. Reaction proceeds when employing as little as about $1 \times 10^{-7}$ mole per liter of liquid reaction mixture (aldehyde, alpha-olefin, hydroperoxide, product and diluent, if any). The upper concentration limit can be quite high, e.g., about $1 \times 10^{-1}$ mole, and higher, per liter of liquid reaction mixture. No particular advantages at the relatively high concentrations of metal-containing compound are manifest. Depending on the correlation of various factors such as the choice and concentration of the organic hydroperoxide, the operative temperature, the choice of the aldehydic and alpha-olefinic reactants, the use of a normally liquid organic diluent, if any, and other considerations, a catalyst concentration of from about $1 \times 10^{-6}$ to about $1 \times 10^{-2}$ mole per liter of liquid reaction mixture, is generally suitable in the practice of the invention. A catalyst concentration of from about $1 \times 10^{-3}$ to about $1 \times 10^{-5}$ mole per liter of liquid reaction mixture is preferred.

The quantity of organic hydroperoxide initiator can vary over a wide range. In general, the novel process is effected in the presence of an initiating amount of the organic hydroperoxide which gives a suitable and reasonable reaction rate. Broadly, one can employ from about $1 \times 10^{-5}$ mole to about 1 mole of hydroperoxide per liter of liquid reaction mixture, and preferably from about $1 \times 10^{-3}$ to about $1 \times 10^{-1}$ mole of hydroperoxide per liter of liquid reaction mixture.

The operative temperature which may be employed can vary over a range of moderately elevated temperatures. In general, the novel process can be conducted at a temperature in the range of from about 45°C to about 125°C. Operative temperatures outside this stated range, though not excluded from the scope of the invention, do not fall within preferred embodiments of the invention. Signs of appreciable decarbonylation of aldehydic reactant become manifest when employing temperatures in excess of the aforesaid range. This disadvantage results in loss of productivity as well as efficiency of the aldehydic reactant. On the other hand, the rate of reaction to desired product becomes markedly slow when operating at temperatures lower than the minimum set out above. An operative temperature in the range of from about 55°C to about 155°C is generally suitable. A preferred temperature range is from about 65°C to about 110°C.

The novel process is effected for a period of time sufficient to produce ketonic products. In general, the residence period can vary from minutes to days, e.g., from about 30 minutes to a couple of days, and longer. It is readily appreciated that the residence period will be influenced, to a significant extent, by the reaction temperature, the concentration and choice of the hydroperoxide initiator and the metal-containing catalyst, the reactants of choice, the use of a diluent, if any, and other factors. In general, the synthesis of desired ketonic product(s) by the coupling reaction of the aldehyde with the alpha-olefin is suitably conducted under operating conditions which give reasonable reaction rates and/or conversions.

As intimated previously, the coupling reaction of the aldehyde and the olefin is effected in the liquid phase. If desired, there can be employed an inert normally liquid organic diluent such as the saturated aliphatic hydrocarbons, dialkyl ketones, benzene and chlorinated benzenes, naphthalene, and the like. Pressure is not narrowly critical and the autogeneous pressure of the reaction is sufficient to maintain the reactants in the liquid phase. In general, pressures ranging from atmospheric, and lower, and upwards to about 200 atmospheres can be employed. When the alpha-olefin is a gaseous reactant, e.g., ethylene, a pressure in the range of from about 500 to about 2,500 psig is suitable.

The relative amounts of aldehyde and alpha-olefin which are initially present in the reaction mixture can be varied over a wide range. Thus, the mole ratio of aldehyde to olefin can be varied from approximately 0.5 to a point where the aldehyde serves as both reactant and diluent. A mole ratio of aldehyde to olefin in the range of from about 1 to about 100 is generally suitable. In the practice of preferred embodiments of the invention highly satisfactory results can be achieved by using from about 2 to about 15 moles of aldehyde per mole of olefin. By way of illustrations, when it is desirable to prepare substantial quantities of methyl ethyl ketone via the practice of the invention, one would employ the acetaldehyde and ethylene reactants in a molar ratio of, for example, approximately 10:1. By using relatively lower molar ratios of acetaldehyde and ethylene, there can be obtained mixtures of methyl alkyl ketones rich in higher boiling liquid ketones, e.g., methyl n-hexyl ketone. It is readily appreciated, therefore, that by the practice of the novel process one can "tailor make" predominant quantities of the ketone of choice.

The novel process can be executed in a batch, semicontinuous, or continuous fashion. The reaction can be conducted in a single reaction zone or a plurality of reaction zones, in series or in parallel, or it may be conducted intermittently or continuously in such zone(s). The material of construction should be such that it is inert during the reaction and the fabrication of the equipment should be able to withstand the reaction temperature and pressure. Agitation means to vary the degree of mixing the reaction mixture can be suitably employed. Means to introduce and/or adjust the reactants, initiator, and catalyst, either intermittently or continuously, into the reaction zone during the course of the reaction can be conveniently utilized in the novel process especially to maintain the desired molar ratios of the reactants.

The novel process can be effected under an inert gas, e.g., nitrogen, if desired. When the olefinic reactant is ethylene, the reaction can be conducted under an ethylene partial pressure with/without an inert gas admixed therewith.

Recovery of the desired ketonic products can be achieved by methods well-known in the art such as by distillation, fractionation, extraction, and the like. A fraction comprising catalyst, generally contained in liquid products and/or normally liquid organic diluent, can be recycled to the reaction zone, if desired. Fresh catalyst can be intermittently added to the recycle stream or directly to the reaction zone.

EXAMPLES 1-3

Two experiments were conducted as follows. A Pyrex reaction vessel equipped with temperature means, stirring means, and a condenser, was flushed with dry nitrogen. To the reaction vessel there were charged n-butyraldehyde and octene-1. To this mixture, there was added a peroxide compound (benzoyl peroxide in the first experiment and t-butyl hydroperoxide in the second experiment). The resulting mixture was brought to a temperature of 70°C under atmospheric pressure and maintained thereat for a period of 21 hours. Thereafter the reaction product mixture was analyzed by gas chromatography and the peroxide content by iodometric titration.

A third experiment was conducted in a similar manner as above with the following exceptions. Tertiary-butyl hydroperoxide was added to the reaction vessel which contained cobalt(II) acetylacetonate, Co(AcAc)$_2$, in addition to n-butyraldehyde and octene-1. The residence time was 19.7 hours in lieu of 21 hours.

The major product of the reaction, 4-dodecanone, was confirmed by comparison of its retention time in a gas-chromatograph with that of an authentic specimen and by a mass spectrum obtained from a gas-chromatograph-mass spectrometer combination. Two $C_{12}$-ketones were also detected in the reaction product mixture. The pertinent data are set out in Table I below.

TABLE I

| FEED | | | |
|---|---|---|---|
| n-Butyraldehyde | | $4.0 \times 10^{-1}$ mole | |
| Octene-1 | | $1.0 \times 10^{-1}$ mole | |
| Nonane | | 1.0 ml | |
| Peroxide | | $4.0 \times 10^{-3}$ mole | |
| Co(AcAc)$_2$ (Experiment 3) | | $4.0 \times 10^{-5}$ mole | |
| EXPERIMENT | 1 | 2 | 3 |
| PRODUCTS (gms) | | | |
| $C_{12}$-ketone | 0.151 | 0.026 | 0.255 |
| $C_{12}$-ketone | 0.448 | 0.102 | 0.860 |
| 4-Dodecanone | 2.299 | 0.462 | 3.762 |
| $C_{20}$-ketone | 0.639 | 0.102 | 0.931 |
| PEROXIDE CONSUMED (%) | 88 | 39 | 93 |
| RATIO OF 4-DODECANONE PRODUCED/ PEROXIDE CONSUMED | 3.6 | 1.6 | 5.5 |

In Examples 4–7 to follow, the acetaldehyde reactant was distilled before use in the experiments. Its boiling point was 21°C/atm. Commercial t-butyl hydroperoxide was distilled and a fraction (b.p. 31°–33°C/10mm. of Hg) was collected. This material was shown to contain more than 98 percent active oxygen by iodometric titration.

The experiments were carried out in a 1-liter autoclave, fitted with a Pyrex glass-liner, a Teflon-coated cooling coil, a stirrer and a pressure relief valve. A chilled acetaldehyde solution of the metal-containing catalyst and nonane (internal standard for the gas chromatographic analysis) was introduced into the autoclave which was previously flushed with dry nitrogen. Ethylene was then introduced into the autoclave and the resulting mixture was heated to reaction temperature. If needed, more ethylene was admitted to adjust the total pressure above the reaction mixture. Thereafter, a mixture of t-butyl hydroperoxide in acetaldehyde was introduced into the autoclave using a backpressure of nitrogen (50 psig) in excess of the prevailing pressure in the autoclave. The reaction product mixture was analyzed by gas chromatography and iodometric titration.

EXAMPLE 4

In this experiment, a mixture of acetaldehyde, t-butyl hydroperoxide, cobalt(II) acetylacetonate, nonane, and ethylene was maintained at a reaction temperature of 80°C ± 2°C under an initial ethylene partial pressure of 760 psig. Samples of the reaction product mixture were analyzed at intervals of 13, 38, 70, 120, and 300 minutes. Additional pertinent data are noted in Table II below.

TABLE II

| FEED | | | | | |
|---|---|---|---|---|---|
| Acetaldehyde | 8.0 moles | | | | |
| t-Butyl hydroperoxide (t-BHP) | $8.0 \times 10^{-2}$ mole | | | | |
| Cobalt(II) acetylacetonate | $8.0 \times 10^{-4}$ mole | | | | |
| Nonane (internal standard) | 10.00 grams | | | | |
| Ethylene (initial pressure) | 760 psig | | | | |
| Nitrogen | 80 psig | | | | |
| REACTION TIME (minutes) | 13 | 38 | 70 | 120 | 300 |
| REACTION PRESSURE (psig) | 780 | 680 | 600 | 500 | 490 |
| PRODUCTS (moles × $10^{-3}$) | | | | | |
| Methyl ethyl ketone (MEK) | 147.2 | 313.4 | 532.3 | 797.3 | 890.4 |
| Methyl n-butyl ketone (MBK) | 62.3 | 116.7 | 159.2 | 245.1 | 253.6 |
| 2-Octanone | 14.2 | 30.3 | 41.5 | 60.7 | 65.3 |
| 2-Decanone | 7.1 | 15.2 | 23.2 | 32.1 | 33.2 |
| 2-Dodecanone | 2.5 | 4.2 | 5.9 | 6.0 | 10.4 |
| TOTAL KETONE (moles × $10^{-3}$) | 233.3 | 479.7 | 760 | 1141.2 | 1252.9 |
| Mole % MEK [1] | 63 | 65 | 70 | 70 | 71 |
| Mole % MBK [1] | 26 | 24 | 21 | 21 | 20 |
| Ratio MEK/MBK | 2.4 | 2.7 | 3.3 | 3.3 | 3.5 |
| ACETALDEHYDE CONVERSION (%) [1] | 2.9 | 6.0 | 9.5 | 14.3 | 15.7 |
| t-BHP CONSUMED (%) | 48 | | 71 | 75 | |
| RATIO TOTAL KETONE PRODUCED/t-BHP CONSUMED | 6.3 | | 13.6 | 19.4 | |

[1] Based on total ketone products. In all instances only trace quantities of unknown materials were detected.

EXAMPLE 5

In this experiment a mixture of acetaldehyde, t-butyl hydroperoxide, cobalt(II) acetylacetonate, and nonane, was maintained at a reaction temperature of 80°C ± 2°C. The reaction mixture was maintained under a constant ethylene partial pressure of 560 psig by continuously introducing ethylene into the reactor. A nitrogen partial pressure of 50 psig was also maintained. Samples of the reaction product mixture were analyzed at intervals of 15, 30, 180, and 270 minutes. Additional pertinent data are noted in Table III below.

EXAMPLE 6

In this experiment a mixture of acetaldehyde, cumyl hydroperoxide, cobalt(II) acetylacetonate, nonane, and ethylene was maintained at a reaction temperature of 100°C ± 2°C under an initial ethylene partial pressure of 1,400 psig and a nitrogen partial pressure of 100 psig. Samples of the reaction product mixture were analyzed at intervals of 10, 20, 30, and 60 minutes. Additional pertinent data are noted in Table IV below.

TABLE III

| FEED | | | | |
|---|---|---|---|---|
| Acetaldehyde | 8.0 moles | | | |
| t-Butyl hydroperoxide (t-BHP) | $7.5 \times 10^{-2}$ mole | | | |
| Cobalt(II) acetylacetonate | $8.0 \times 10^{-4}$ mole | | | |
| Nonane (internal standard) | 10.0 grams | | | |
| Ethylene | maintained at 560 psig | | | |
| Nitrogen | 50 psig | | | |
| REACTION TIME | | | | |
| (minutes) | 15 | 30 | 180 | 270 |
| PRODUCTS (moles $\times 10^{-3}$) | | | | |
| Methyl ethyl ketone (MEK) | 163.6 | 285.1 | 811.2 | 819.6 |
| Methyl n-butyl ketone (MBK) | 35.6 | 55.9 | 191.1 | 191.0 |
| 2-Octanone | 7.4 | 10.7 | 30.7 | 34.6 |
| 2-Decanone | 1.1 | 6.3 | 18.1 | 19.7 |
| 2-Dodecanone | — | — | 2.8 | 3.7 |
| TOTAL KETONE | | | | |
| (moles $\times 10^{-3}$) | 207.7 | 358.0 | 1053.9 | 1068.7 |
| Mole % MEK [1] | 79 | 80 | 77 | 77 |
| Mole % MBK [1] | 17 | 16 | 18 | 18 |
| ACETALDEHYDE CONVERSION (%) [1] | 2.6 | 4.5 | 13.2 | 13.4 |
| t-BHP CONSUMED (%) | 27 | 67 | 78 | 95 |
| RATIO TOTAL KETONE PRODUCED/t-BHP CONSUMED | 10.1 | 7.1 | 17.4 | 14.9 |

[1] Based on total ketone products. In all instances, only trace quantities of unknown materials were detected.

TABLE IV

| FEED | | | | |
|---|---|---|---|---|
| Acetaldehyde | 8.0 moles | | | |
| Cumyl hydroperoxide | $8.0 \times 10^{-2}$ mole | | | |
| Cobalt(II) acetylacetonate | $8.0 \times 10^{-4}$ mole | | | |
| Nonane (internal standard) | 10.00 grams | | | |
| Ethylene (initial pressure) | 1400 psig | | | |
| Nitrogen | 100 psig | | | |
| REACTION TIME | | | | |
| (minutes) | 10 | 20 | 30 | 60 |
| REACTION PRESSURE | | | | |
| (psig) | 1100 | 1080 | 1020 | 860 |
| PRODUCTS | | | | |
| MEK[1] moles $\times 10^{-3}$ | 229.7 | 474.2 | 648.2 | 850.9 |
| MNBK[2] moles $\times 10^{-3}$ | 120.5 | 243.9 | 328.2 | 402.8 |
| MNHK[3] moles $\times 10^{-3}$ | 50.2 | 91.2 | 115.5 | 154.7 |
| 2-decanone moles $\times 10^{-3}$ | 28.3 | 52.6 | 70.8 | 87.9 |
| 2-dodecanone, moles $\times 10^{-3}$ | 13.6 | 25.6 | 32.4 | 37.9 |
| Unknown, grams | 1.53 | 2.16 | 2.75 | 3.71 |
| TOTAL KETONE | | | | |
| (moles $\times 10^{-3}$) | 442.3 | 887.4 | 1195.0 | 1534.2 |
| Mole % MEK[4] | 52 | 53 | 54 | 55 |
| Mole % MNBK[4] | 27 | 27 | 27 | 26 |
| Mole % MNHK[4] | 11 | 10 | 10 | 10 |
| ACETALDEHYDE CONVERSION % | 6 | 11 | 15 | 19 |

[1] Methyl ethyl ketone
[2] Methyl n-butyl ketone
[3] Methyl n-hexyl ketone
[4] Based on total ketone product

EXAMPLE 7

In this experiment, a mixture of acetaldehyde, cumene hydroperoxide, cobalt(II) acetylacetonate, nonane, and ethylene was maintained at a reaction temperature of 80°C under an initial ethylene partial pressure of 840 psig and a nitrogen partial pressure of 50 psig. Samples of the reaction product mixture was analyzed at intervals of 20, 60, 120, and 270 minutes. Additional pertinent data are noted in Table V below.

dometric titration. There was obtained 57 weight percent 4-dodecanone, based on the total weight of ketone products. The t-butyl hydroperoxide consumed was 89 percent. The ratio of total ketone produced/t-butyl hydroperoxide consumed was 4.1.

EXAMPLE 9

In a manner similar to Examples 1–3 supra, the following mixture was charged to the Pyrex reaction vessel:

TABLE V

FEED

| | |
|---|---|
| Acetaldehyde | 8.0 moles |
| Cumyl hydroperoxide (CHP) | $8.0 \times 10^{-2}$ mole |
| Cobalt(II) acetylacetonate | $8.0 \times 10^{-4}$ mole |
| Nonane (internal standard) | 10.00 grams |
| Ethylene (initial pressure) | 760 psig (3.71 moles required) |
| Nitrogen | 50 psig |

| REACTION TIME (minutes) | 20 | 60 | 120 | 270 |
|---|---|---|---|---|
| REACTION PRESSURE (psig) | 740 | 580 | 520 | 460 |
| PRODUCTS (moles × $10^{-3}$) | | | | |
| Methyl ethyl ketone (MEK) | 207.3 | 566.3 | 664.4 | 749.5 |
| Methyl n-butyl ketone (MBK) | 71.6 | 185.7 | 225.5 | 237.3 |
| 2-Octanone | 19.1 | 46.5 | 57.6 | 55.1 |
| 2-Decanone | 11.2 | 25.8 | 29.4 | 32.1 |
| 2-Dodecanone | 2.3 | 5.9 | 8.4 | 9.1 |
| TOTAL KETONE (moles × $10^{-3}$) | 311.5 | 830.2 | 985.3 | 1083.1 |
| Mole % MEK[1] | 67 | 68 | 67 | 69 |
| Mole % MBK[1] | 23 | 22 | 23 | 22 |
| ETHYLENE IN PRODUCTS (moles × $10^{-3}$) | 464.9 | 1209.9 | 1447.8 | 1563.3 |
| % INITIAL ETHYLENE CONVERTED | 12.5 | 32.6 | 39.1 | 42.2 |
| CHP CONSUMED (%) | 42 | 76 | 83 | 96 |
| TOTAL KETONE/ CHP CONSUMED | 8.7 | 14.5 | 15.7 | 15.0 |
| ACETALDEHYDE CONVERSION | 3.9 | 10.4 | 12.3 | 13.5 |

[1] Based on total ketone products.

EXAMPLE 8

In a manner similar to Examples 1–3 supra, the following mixture was charged to the Pyrex reaction vessel:

| | |
|---|---|
| n-Butyraldehyde | $4.0 \times 10^{-1}$ mole |
| Octene-1 | $1.0 \times 10^{-1}$ mole |
| Nonane | 1.0 ml. |
| Cobalt(II) acetate | $7.6 \times 10^{-4}$ mole |
| t-Butyl hydroperoxide | $4.0 \times 10^{-3}$ mole |

The resulting mixture was brought to a temperature of 70°C and maintained thereat for a period of 21 hours. Thereafter the reaction product mixture was analyzed by gas chromatography and the peroxide content by iodometric titration. There was obtained 57 weight percent 4-dodecanone, based on the total weight of ketone products. The t-butyl hydroperoxide consumed was 89 percent. The ratio of total ketone produced/t-butyl hydroperoxide consumed was 4.1.

| | |
|---|---|
| n-Butyraldehyde | $4.0 \times 10^{-1}$ mole |
| Octene-1 | $1.0 \times 10^{-1}$ mole |
| Nonane | 1.0 ml. |
| Manganese(II) acetylacetonate | $8.2 \times 10^{-3}$ mole |
| t-Butyl hydroperoxide | $4.0 \times 10^{-3}$ mole |

The resulting mixture was brought to a temperature of 70°C and maintained thereat for a period of 19.7 hours. Thereafter the reaction product mixture was analyzed by gas chromatography and the peroxide content by iodometric titration. There was obtained 57 weight percent 4-dodecanone, based on the total weight of ketone products. The t-butyl hydroperoxide consumed was 75 percent. The ratio of total ketone produced/t-butyl hydroperoxide consumed was 6.6.

EXAMPLE 10

In a manner similar to Examples 1–3 supra, the following mixture was charged to the Pyrex reaction vessel:

| | |
|---|---|
| n-Butyraldehyde | 4.0 × 10⁻¹ mole |
| Octene-1 | 1.0 × 10⁻¹ mole |
| Nonane | 1.0 ml. |
| Manganese(III) acetylacetonate | 7.6 × 10⁻³ mole |
| t-Butyl hydroperoxide | 4.0 × 10⁻³ mole |

The resulting mixture was brought to a temperature of 70°C and maintained thereat for a period of 20.7 hours. Thereafter the reaction product mixture was analyzed by gas chromatography and the peroxide content by iodometric titration. There was obtained 56 weight percent 4-dodecanone, based on the total weight of ketone products. The t-butyl hydroperoxide consumed was 50 percent. The ratio of total ketone produced/t-butyl hydroperoxide consumed was 5.7

EXAMPLE 11

In a manner similar to Examples 1–3 supra, the following mixture was charged to the Pyrex reaction vessel:

| | |
|---|---|
| n-Butyraldehyde | 4.0 × 10⁻¹ mole |
| Octene-1 | 1.0 × 10⁻¹ mole |
| Nonane | 1.0 ml. |
| Chromium(III) acetylacetonate | 7.6 × 10⁻³ mole |
| t-Butyl hydroperoxide | 4.0 × 10⁻³ mole |

The resulting mixture was brought to a temperature of 70°C and maintained thereat for a period of 21.5 hours. Thereafter the reaction product mixture was analyzed by gas chromatography and the peroxide content by iodometric titration. There was obtained 58 weight percent 4-dodecanone, based on the total weight of ketone products. The t-butyl hydroperoxide consumed was 39 percent. The ratio of total ketone produced/t-butyl hydroperoxide consumed was 2.8.

What is claimed is:

1. A process for producing ketones which comprises reacting (i) in the liquid phase: (ii) an alpha-olefin of the formula $R^1CH=CH_2$ wherein $R^1$ represents hydrogen or alkyl of 1 to 18 carbon atoms, with an alkanal of from 2 to 8 carbon atoms; (iii) in the presence of an initiating amount of an organic hydroperoxide which is characterized by the unit —O—O—H, said unit being monovalently bonded to an aliphatic carbon atom of a hydrocarbyl group free of ethylenic and acetylenic unsaturation, said hydrocarbyl group having from 4 to 12 carbon atoms; and (iv) a catalytically effective quantity of a metal-containing compound, the metal moiety of which is selected from the group consisting of cobalt, manganese, chromium and iron, wherein the metal moiety of said metal containing compound is capable of readily undergoing a one electron redox cycle between a relatively stable plus two (+2) oxidation state and a relatively stable plus three (+3) oxidation state; (v) at an elevated temperature of from about 45°C to about 125°C; and (vi) for a period of time sufficient to produce said ketones.

2. The process of claim 1 wherein the concentration of said metal-containing catalyst is in the range of from about $1 \times 10^{-7}$ to about $1 \times 10^{-1}$ mole per liter of liquid reaction mixture, and wherein the concentration of said hydroperoxide is in the range of from about $1 \times 10^{-5}$ to about 1 mole per liter of liquid reaction mixture.

3. The process of claim 2 wherein the concentration of said metal-containing catalyst is in the range of from about $1 \times 10^{-6}$ to about $1 \times 10^{-2}$ mole per liter of liquid reaction mixture, and wherein the concentration of said hydroperoxide is in the range of from about $1 \times 10^{-3}$ to about $1 \times 10^{-1}$ mole per liter of liquid reaction mixture.

4. The process of claim 2 wherein a mole ratio of said aldehyde to said alpha-olefin initially present in the reaction mixture is at least approximately 0.5.

5. The process of claim 3 wherein a mole ratio of said aldehyde to said alpha-olefin initially present in the reaction mixture is in the range of from about 1:1 to about 100:1.

6. The process of claim 4 wherein said metal moiety is cobalt.

7. The process of claim 6 wherein said aldehyde is acetaldehyde and wherein said alpha-olefin is ethylene.

* * * * *

UNITED STATES PATENT OFFICE
CERTIFICATE OF CORRECTION

Patent No. 3,865,881  Issue Date February 11, 1975

Inventor(s) Charles H. McMullen

It is certified that error appears in the above-identified patent and that said Letters Patent are hereby corrected as shown below:

Column 5, line 30, "155°C" should read --- 115°C ---.

Signed and Sealed this twenty-second Day of July 1975

[SEAL]

Attest:

RUTH C. MASON
Attesting Officer

C. MARSHALL DANN
Commissioner of Patents and Trademarks